United States Patent [19]

Russell, Jr.

[11] 4,024,711

[45] May 24, 1977

[54] THROTTLE CONTROL MECHANISM FOR AN ENGINE

[76] Inventor: Wayne B. Russell, Jr., 3895 Lugo Ave., Lynwood, Calif. 90262

[22] Filed: June 4, 1976

[21] Appl. No.: 692,961

Related U.S. Application Data

[62] Division of Ser. No. 540,396, Jan. 13, 1975, Pat. No. 3,973,472.

[52] U.S. Cl. .................................. 60/423; 60/431; 417/1
[51] Int. Cl.$^2$ .................... F16D 31/00; F15B 13/06
[58] Field of Search .................. 60/423, 431; 417/1

[56] References Cited

UNITED STATES PATENTS

| 2,112,466 | 3/1938 | Maloon | 91/400 X |
| 2,690,712 | 10/1954 | Foote | 60/431 X |
| 2,916,880 | 12/1959 | Hann | 60/431 X |

Primary Examiner—Edgar W. Geoghegan
Attorney, Agent, or Firm—Donald D. Mon

[57] ABSTRACT

The throttle of an engine is controlled to maintain its speed substantially constant in spite of variations of load upon it. The illustrated load comprises hydraulically operated equipment in a hydraulic system powered by a pump driven by the engine. Throttle control mechanism comprises a pair of cylinders supplied from fluid pressure in the hydraulic system. Pistons in the respective cylinders are connected by pivots with a control arm linked to the throttle control. When equipment is hydraulically operated from the hydraulic system, the fluid back pressure against the pump increases, this back pressure being greater the greater the hydraulic load. The increased load on the engine from the pump would slow the engine down if its throttle opening were to remain at its original setting. The function of the throttle control mechanism operated from the hydraulic pressure from the pump, is to move the control arm by a proper amount to open the throttle a sufficient amount to keep the engine speed up to its normal value regardless of changes of load. Compression springs adjustable from adjustable bushings at the cylinders provide a counter-pressure opposing the pressure from the fluid in the cylinders and by suitable adjustment of these bushings the throttle can be made to open or close further in accordance with changes of load to maintain substantially constant engine speed which will maintain uniform flow of fluid through the hydraulic system regardless of load thereon.

7 Claims, 4 Drawing Figures

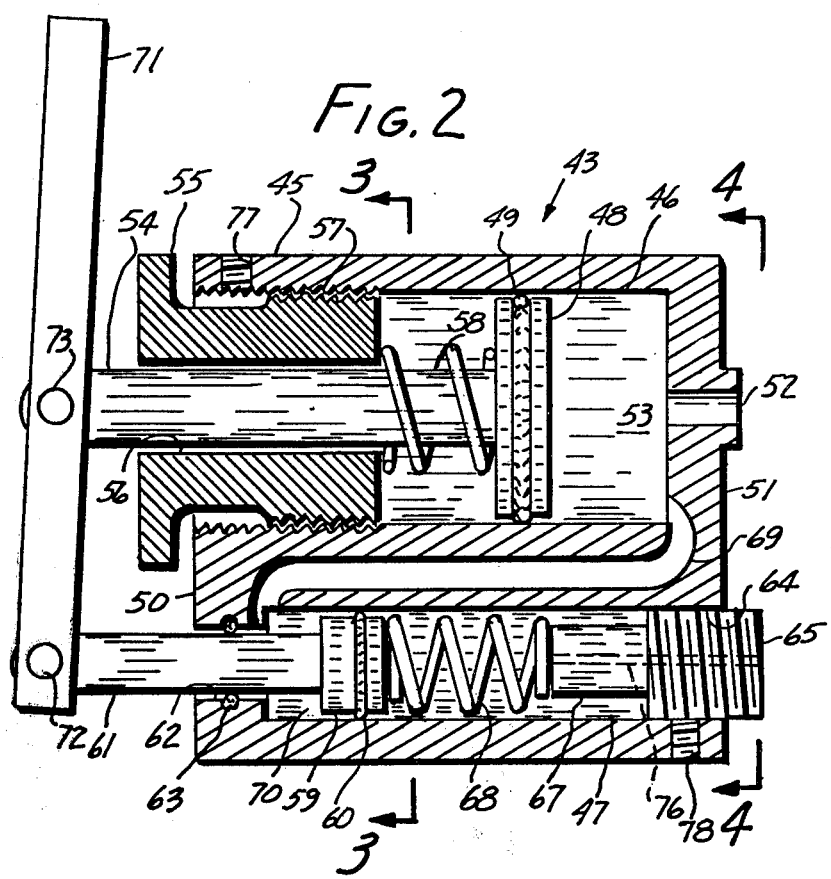
Fig. 2
Fig. 3
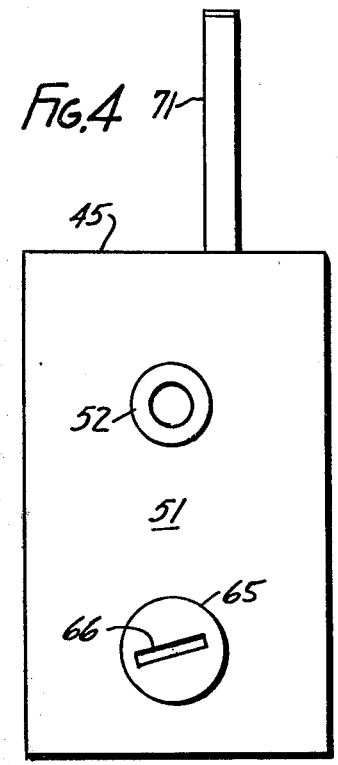
Fig. 4
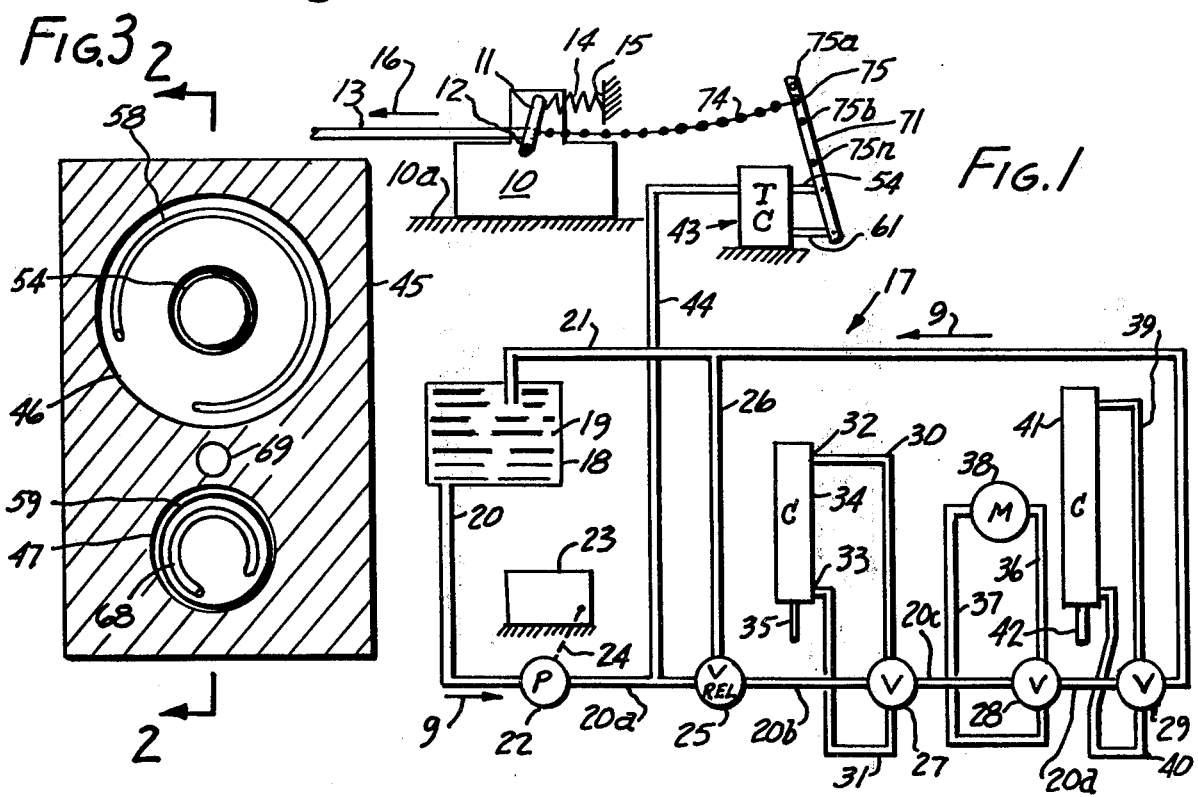
Fig. 1

THROTTLE CONTROL MECHANISM FOR AN ENGINE

This is a division of application Ser. No. 540,396, filed Jan. 13, 1975 now U.S. Pat. No. 3,973,472 granted Aug. 10, 1976.

This invention relates to a mechanism and system for controlling an engine throttle to maintain the engine speed substantially constant in spite of changes of load on the engine.

It is well known that the speed of an internal combustion engine such as carburetor-operated engine of which the common gasolene engine is typical, or an injector type engine generally known as a diesel engine, decreases with increase of load on the engine unless the throttle controlling the carburetor or injector is correspondingly opened further. There are many instances where the load on the engine frequently changes and it is disadvantageous to have to tend the throttle to adjust in manually to compensate for these changes.

A typical instance is the driving of a hydraulic ram or the like by a pump in a hydraulic system in which the pump is driven by the engine. Another instance is in the operation of a Kelly drive for an earth auger which involves the extension and retraction of a shaft carrying the auger and may also involve the operation of a motor for rotating the auger shaft. These are only some of the many situations in which the loading of an engine tends to slow it down. In the operation of such systems the slowing down of the engine is undesirable, and can be avoided to a great extent by adjustment of the engine throttle.

An object of the present invention is to provide a mechanism and system for making such throttle adjustments automatically.

A related object is to provide a hydraulic pumping system containing the throttle control mechanism.

A further related object is to provide such a hydraulic system adapted to drive equipment.

The invention is carried out by provision of a throttle control mechanism operable from a hydraulic circuit and provided with linkage means for controlling the throttle in accordance with pressure in the hydraulic system so that when the hydraulic pressure rises the throttle opens further and when the pressure falls the throttle moves to a more closed position. The throttle control mechanism comprises a pair of hydraulic cylinders each containing a piston connected at spaced positions on a control member or arm which may be termed a hydraulic fulcrum linked to the throttle of the engine. There is a hydraulic fluid inlet to the cylinders so that changes of fluid pressure move both pistons and also the floating fulcrum member.

A feature of the invention resides in the making of one of the cylinders and pistons of greater diameter than the other.

A further feature resides in the use of means applying pressure to the pistons in opposition to the fluid pressure from the pump.

A further feature resides in the provision of means for adjusting the said opposing pressures.

Another feature resides in relating the position where the linkage is attached to the control arm relative to the positions where the pistons are connected to the control arm so that movements of the pistons produce desired movements of the throttle under different conditions of hydraulic pressures at the pump.

By reason of the arrangement of this invention it is possible to maintain the pump speed and hydraulic fluid flow in the hydraulic system substantially constant over a wide range of fliud pressures resulting from varying hydraulic loads on the pump. The foregoing and other features of the invention will be better understood from the following detailed description and the accompanying drawing of which:

FIG. 1 shows a system containing a throttle control mechanism according to this invention;

FIG. 2 is a longitudinal cross-section view of the throttle control device included in the system of FIG. 1, the cross-section being taken at line 2—2 of FIG. 3;

FIG. 3 is a cross-section view taken at line 3—3 of FIG. 2; and

FIG. 4 is an end view looking from line 4—4 of FIG. 2.

In FIG. 1 there is shown a hydraulic system controlling the throttle of an engine which may for example be an internal combustion engine having a carburetor or a diesel engine having an injector. No part of the engine is shown in FIG. 1 except for its representation by a rectangle 23 and a support member 10 indicated as being mounted on a base 10a, to which there is attached a throttle arm 11 pivoted to support 10 at a pivot 12. Assuming that the engine is on a vehicle to be driven by the engine there will be a lever 13 from a foot pedal (not shown), attached to the throttle arm at some distance from its pivot. A compression spring 14 compressed between the lever arm 11 and a member 15 which is fixed relative to support 10 urges the lever arm to rotate in the counter-clockwise direction as shown in FIG. 1, which will apply pressure to the foot pedal arm in the direction shown by arrow 16.

There is associated with the engine a hydraulic system 17 having a reservoir 18 containing hydraulic fluid 19. The reservoir is enclosed except for an outlet conduit 20 and a return conduit 21. The outlet conduit 20 connects with a pump 22 driven by the engine, represented by rectangle 23, as indicated by the dotted line 24. The high pressure side of the pump supplies a conduit section 20a leading to a relief valve 24 of a well known type which operates in a well known manner to bleed off fluid received from conduit section 20a, at the outlet from the pump, if the pressure at the relief valve exceeds a predetermined set value, in which event the fluid thus bled off is sent through a by-pass conduit 26 to the return conduit 21 to the reservoir, thus keeping the pressure from the pump at or below the set pressure limit. Down stream from the relief valve 25 there is shown a number of devices operable from the pressurized hydraulic fluid. Thus a conduit section 20b carries the pressurized fluid to valves 27, 28 and 29 arranged in tandem along the conduit sections 20b, 20c and 20d, respectively, the last valve connecting with the return conduit 21.

Valve 27 has connected to it two conduits 30 and 31 which communicate with respective ports 32 and 33 at opposite ends of a hydraulic cylinder 34 which is of a well-known type having a rod or a member 35 protruding from it and connected with a piston (not shown) within the cylinder between the ports 32 and 33. The valve 27 is of a well-known type operable manually or by remote control to any of three positions. In a first position it puts the pressurized fluid from conduit 20b into conduit 30, but not into conduit 31, to move member 35 downward, and also receives and transmits to conduit section 20c, fluid forced out of the cylinder through conduit 31. In a second position it puts pressurized fluid from conduit 20b into conduit 31, but not into conduit 30, to move the member 35 upward, and at the same time receives and transfers fluid force out through port 32 through conduit 30, into conduit section 20c. In the third position it puts pressurized fluid from conduit 20b into communication with conduit 20c, while blocking communication of both conduits 30 and 31 to either of conduits 20b and 20c.

The other valves 28 and 29 are similar to valve 27 and are connected with hydraulic conduits in the same manner as in the case of valve 27. Thus, valve 28 connects with respective conduits 36 and 37 leading to a fluid motor 38 so that the motor may be turned in either direction or not at all, depending on which one of the three positions of valve 28 is selected. Similarly, valve 29 has connected to it conduits 39 and 40 which lead to ports at opposite ends of a cylinder 41 containing a piston actuated member 42, in a manner similar to the hydraulic arrangement associated with cylinder 34. Similarly, the member 42 of cylinder 41 may be operated in either direction, or not at all, depending upon the particular one of the three positions of valve 29 which is selected. Regardless of which positions the valves 27, 28 and 29 are put into there will always by hydraulic fluid circulating in the direction of arrows 9 through conduit 20 and through all of these valves to conduit 21 and back to the reservoir.

In the arrangement shown in FIG. 1 it is assumed, as an example, tht the cylinders 34 and 41 and the motor 38, the reservoir 18 and the pump 22 are mounted with the engine 23 as equipment on a portable earth-drilling rig. Thus the cylinder 34 and its ram 35 may be used in a well-known manner for leveling the rig; the shaft 42 of cylinder 41 may be provided with an earth-drilling auger in a well-known manner; and the motor 38 may be coupled with the shaft 42 to rotate the shaft relative to its cylinder for drilling purposes. Such equipment is well known in the drilling art. It should be understood that the cylinders and the motor illustrated are shown simply as examples of typical equipment, and that more or less of such equipment, or different equipment, operated hydraulically may be utilized in such a system.

It is seen that when the valves 27, 28 and 29 are all turned to the same position in which the hydraulic fluid flows directly from conduits 20a, 20b, 20c and 20d to return conduit 21 the engine 23 need do only sufficient work on pump 22 to move the fluid in this path of travel, which will be opposed only by friction in the conduits and valves. But when any one or more of the valves 27, 28 and 29 is moved to a position in which work is being done at one or more of cylinders 34 and 41 and motor 38, the engine must work harder in order to do this work. Assuming the engine throttle to be set at some particular position, the effect of the increased load at any one or more of components 34, 41 and 38 will slow down the engine, which will result in a corresponding decrease of rate of flow through pump 22 and a corresponding slowing of movement of cylinder members 35 and 42 and of motor 38.

In accordance with the present invention provision is made for automatically controlling the throttle so that the engine will maintain its speed regardless of the load on it. This is done by use of a throttle control mechanism 43 hydraulically connected to conduit 20a by means of a fluid conduit 44.

The throttle control mechanism 43 is shown in detail in FIGS. 2, 3 and 4. It comprises a housing or block 45 of generally rectangular cross-section within which there are formed two cylinders 46 and 47, cylinder 46 being of substantially greater diameter than cylinder 47. Cylinder 46 contains a piston 48 reciprocatable longitudinally through the cylinder and sealed to the inner cylinder wall by an O-ring 49. Cylinder 46 is opened to the exterior at one end 50 of the block but is closed from the exterior at the other end 51 of the block except for an inlet opening or port 52 which provides communication from the exterior of the block to region 53 within the cylinder 46 between the piston and the end 51. A piston rod 54 is attached to the side of piston 48 opposite the region 53 and extends along the longitudinal axis of the cylinder to the exterior of the block, through a plug bushing 55 provided with a central axial opening 56 for the purpose. There is enough clearance between piston rod 54 and the opening 56 to vent the space within the cylinder 46 back of the piston for passage of air when the piston moves. Plug bushing 55 is provided with threads 57 for engaging corresponding threads on the interior wall of a cylinder so that the bushing may be moved longitudinally through the cylinder within limits determined by the extent of the cylinder threads. A helical compression spring 58 is placed around the piston rod 54 with its respective ends adapted to engage the bushing and the piston.

The second cylinder 47 is positioned in the block with its longitudinal axis parallel to that of the first cylinder 46. Cylinder 47 contains a piston 59 reciprocatable longitudinally within this cylinder and provided with an O-ring seal 60 to provide fluid sealing between the piston and the inner wall of the cylinder. A piston rod 61 is attached to the piston so that it extends longitudinally outward through an opening 62 through end 50 of the block in a direction parallel to the piston rod 54. An O-ring seal 63 at opening 62 provides for fluid sealing between the piston rod 61 and the wall of opening 62. The end of cylinder 47 opposite the opening 62 opens to the exterior of the block at the end 51 of the block. The end of the cylinder at this opening is provided with threads 64 which are engaged by corresponding threads of a screw plug 65 provided with a slot 66 at its outer end for turning by a screw driver. The inner end of screw plug 65 is provided with an unthreaded shank portion 67 adapted to engage the end of a helical compression spring 68, the other end of which is adapted to engage the side of piston 59 opposite its piston rod. A longitudinal vent passageway 76 is provided through screw 65 for passage of air when piston 59 moves. Tapped holes 77 and 78 are for set screws to bind the respective plugs 55 and 65 after they are adjusted.

A passageway 69 is formed through the block so that one of its ends communicates with the region 53 within cylinder 46 and the other end communicates with a region 70 of cylinder 47 between the piston and the opening 62 through the block.

An arm 71 outside the block is attached to piston rod 61 by a pivot pin 72 and also attached to piston rod 54 by a pivot pin 73. A chain 74, shown in FIG. 1, is attached to the arm 71 at a position 75 at the opposite side of pivot 73 from pivot 72. The distance along the arm between pivot 73 and position 75 is preferably greater than the distance between pivots 72 and 73 and may conveniently be made about twice the distance between the two pivot pins. The other end of chain 74 is attached to the throttle arm 11 so that when the position 75 of arm 71 moves to the right as seen in FIG. 1 the chain 74 can pull on the throttle arm 11 to pivot it in the clockwise direction, that is, the same direction that pushing the foot pedal 13 and lever to the right will do. When the position 75 moves to the left the pressure from compression spring 14 then pivots the throttle arm 11 correspondingly in the counter-clockwise direction, assuming there is no pressure on the foot pedal. To permit adjustment of the position of attachment of the chain 74 to arm 71 this end of the chain may be provided with a hook or the like, and at position 75 of the arm there may be a hole or equivalent to which the hook can be engaged. Furthermore a number of elements 75a, 75b . . . 75n may be provided along the arm so that the hook can be attached to any one of them. Selection of the position of attachment of the chain to the arm controls the effects on the throttle, of increments of movement of the two pistons.

The operation of the system is as follows: Assume that the pump 22 is set into operation by the engine while all of valves 27, 28 and 29 are positioned to send the fluid directly from the pump through conduits 20a, 20b, 20c, 20d and 21 back to the reservoir. The engine then will be delivering relatively little horsepower as there will be little back pressure against the pump. But if any of the components 34, 38 and 41 is set into operation by appropriate turning of any of the valves 27, 28 or 29 the back pressure against the pump will increase and the pump will exert a greater load on the engine which would slow the engine down if the throttle control mechanism were not in operation. If an additional one or ones of the components 34, 38 and 41 be turned on, the engine would correspondingly slow down still further, in the absence of the throttle control. It is ordinarily desired that a normal fluid flow shall take place in the hydraulic circuit of each of components 34, 38 and 41 regardless of how many of them are turned on at the same time. The throttle control mechanism 43 is capable of maintaining the engine speed substantially constant throughout such changes of load on the engine and therefore of maintaining the same pumping rate from the pump.

At all times while the pump is being driven by the engine, fluid is circulating through the hydraulic circuit from the reservoir through the pump and conduits 20a, 20b, 20c, 20d and 21 to the reservoir; and slso conduit 44, chamber 53, conduit 69 and chamber 70 are filled with the fluid. Whatever pressure exists at the outlet of the pump is applied at region 53 tending to urge piston 48 to move toward the plug bushing 55. Since this pressure is also conveyed to region 70 of cylinder 47 the fluid pressure will tend to move piston 59 toward screw plug 65. The compression springs 58 and 68 tend to oppose such movements of the pistons. The fluid pressure at inlet port 52 will vary with variations of fluid back pressure at the pump, and the pistons 48 and 59 will come to positions in the respective cylinders in which the counter pressures of the respective compression springs 58 and 68 are in balance with the fluid pressures. Since the block 45 of throttle control 43 is fixed relative to the support 10 for the throttle arm 11 the arm 71 will assume different positions and attitudes relative to the throttle arm 11, depending upon the fluid pressure at conduit 20a.

Considering the piston rod 54, whenever the fluid pressure at chamber 53 tends to rise, this piston rod tends to move to the right, with reference to FIG. 1, thereby tending to open the throttle further. Considering the piston rod 61, whenever the fluid pressure at chamber 70 tends to rise this piston rod tends to move to the left with reference to FIG. 1 thereby also tending to open the throttle further. Since the area of piston 48 is much greater than that of piston 59, the condition of a relatively low pressure will move piston 48 while imparting little or no motion to piston 61. But when the fluid pressure increases, the piston 48 moves closer to the bushing plug 55, and when it has compressed the spring 58 as far as the spring can be compressed, the piston 54 can have no further movement even though the fluid pressure rises further. At these relatively high fluid pressures, the pressure against the smaller piston 59 becomes sufficient to move the piston 59 toward the screw plug 65 to impart movement to the piston rod 61, and when the fluid pressure continues to increase further, the piston 59 will continue to move further toward screw plug 65 while compressing spring 68 even up to the highest pressures developed in the system.

It is noted that a given increment of movement, for example one millimeter, of piston rod 61 has a greater effect on movement of position 75 on arm 71 than does the same increment of movement of piston rod 54, for the reason that pivot point 73 lies between pivot point 72 and position 75, and the distance between pivot 73 and position 75 is greater than the distance between pivots 72 and 73.

When the pump is disconnected from the engine and there is no load on the engine the throttle will ordinarily be adjusted for a proper idling speed. Assuming that the engine is in a vehicle, the engine may be speeded up from its idling speed by depressing the foot pedal and the vehicle may be driven by the engine on a roadway in a well-known manner, without any effect from the throttle control unit 43. When the vehicle has been thus moved to its destination the pump may then be connected to be driven by the engine.

Assume that when the driving of the pump is started up none of the equipment 34, 38 and 41 is yet activated to load the pump. The back pressure at the pump will then only be that due to the fluid friction through the hydraulic system. It is normally desirable that under this condition the revolutions per minute (rpm) of the pump should be greater than that which the idling speed of the engine would produce. Accordingly, the plugs 55 and 65 will ordinarily be adjusted for proper spring pressures and the chain 74 will be attached to a proper one of the positions 75a, 75b . . . 75n, so that when the pump starts up it will develop enough fluid pressure to move piston rod 54 enough to open the throttle enough to speed up the engine somewhat to bring the pump rpm and gallons per minute (gpm) flow to a certain desired rate which is herein referred to as a pre-set rate. Now assuming a small load is put on the pump by activation of one of the equipments 34, 38 and 41, the effect will be to move piston 48 somewhat with no substantial movement of piston 59. This will open the throttle further to produce the increment of horsepower neeeded to maintain constant the rpm and hence gpm. As the load increases somewhat, this same effect will continue to open the throttle enough to create additional horesepower needed to maintain constant the rpm and gpm. As the piston 48 and piston rod 54 come close to the end of their possible travel while the fluid pressure and pressure of spring 58 are increasing, the piston 48 will have little further effect on the throttle with increasing load and fluid pressure. It will have a relatively minor effect at the higher fluid pressures because it takes a relatively great amount of pressure to urge the spring 58 through its last stage of compression to its maximum compressed position. However, after the fluid pressure has become moderately high, which will be close to the end of travel of piston 48, the pressure has become high enough to move piston 59 substantially against the pressure of its spring 68. This will continue to open the throttle, as the load, and hence fluid pressure, continues to increase to higher values thereby continuing to create the horsepower required to maintain the rpm and gpm substantially constant. Furthermore, the piston 59 is effective over a wide range of the higher pressures due not only to the fact that as illustrated in FIG. 2, the piston 59 may have a greater travel possibility than piston 48, but also due to the fact that a given linear motion of piston rod 61 moves the position 75 through a greater distance than does the same increment of piston rod 54.

As an example, assume that the hydraulic system is capable of an operation of from close to 0 pounds per square inch fluid pressure when there is no equipment load on the pump, and up to a maximum capability of 3000 pounds per square inch fluid pressure which may exist when the maximum equipment load is put on the system. The unit 43 may be adjusted by its plugs 55 and 65 and the hook attachments 75, 75a . . . 75n, so that at low and moderate loads creating a fluid pressure up to, say, about 50 pounds per square inch, piston 48 is effective to control the throttle, while there is little or no movement of piston 59. But above the 50 pounds per square inch pressure, piston 48 is pushed almost against the plug 55 and cannot move appreciably further, but piston 59 will then undergo substantial increments of movement with further rising fluid pressure, and hence effectively control the throttle.

It should be understood that variations may be made from the foregoing explanation of a generally preferred mode of operation of the throttle control mechanism. Such variations can be realized by appropriate adjustments of the three adjustable devices: plug bushing 55; plug screw 65; and the selection of positions 75 or 75a . . . 75n.

It will also be recognized that variations of structure may be made within the scope of the invention. For example types of springs or resilient means other than the coil springs 58 and 68 may be used. Although the cylinders 46 and 47 are shown in the drawing as formed in a single block, they could if desired, be formed in separate blocks.

The diameters of the pistons and the ratio of these diameters and the spacing of the pivot on the arm 71 are subject to selection and will depend on the requirements of particular situations. It has been found that for one application piston diameters of ¾ inch and 1½ inch respectively with a spacing of 2-⅛ inches between the pivot positions has been satisfactory, and in this case the distance along pivoted member 71 from the pivot position 73 of piston rod 54 to the position of attachment of chain 74 to member 71 was about 2-¼ inches.

The hydraulic fluid will ordinarily be oil, but it will be understood that some other liquid may be used.

It will be understood that the embodiments of the invention illustrated and described herein are given by way of illustration and not of limitation, and that modifications or equivalents or alternatives within the scope of the invention may suggest themselves to those skilled in the art.

I claim:

1. In combination, an engine having a throttle arm, a hydraulic pump driven by the engine, and a throttle control mechanism said throttle control mechanism comprising:
   a first cylinder with a closure at each end thereof;
   a first piston reciprocatable within said first cylinder;
   a first piston rod connected to said first piston and extending through are of said first cylinder closures to the exterior of the first cylinder;
   a second cylinder with a closure at each end thereof;
   a second piston reciprocatable within said second cylinder;
   a second piston rod connected to said second piston and extending through one of said second cylinder closures to the exterior of said second cylinder;
   a member pivoted to both said piston rods at respective positions outside of said cylinders;
   fluid inlet means into a region of said first cylinder at one side of the first piston and into a region of said second cylinder at one side of the second piston;
   whereby pressurized fluid introduced through said fluid inlet means into said cylinders urges both said pistons to move longitudinally within their respective cylinders;
   means uring each piston to move longitudinally in the direction opposite that in which the fluid pressure is urging it;
   the longitudinal axes of said cylinders being oriented relative to each other so that when said pistons move in the directions in which they are urged by the fluid pressure each piston has a component of motion in the direction opposite that of the other piston;
   linkage means connecting said pivoted member with said throttle arm, and a hydraulic conduit leading from the outlet of said pump to said fluid inlet means,
   whereby increased fluid pressure at the pump outlet moves said pivoted member in a direction which further opens the throttle.

2. A combination according to claim 1 in which the hydraulic pump is in a hydraulic circuit including a fluid reservoir and fluid operable equipment which when operated tends to increase the back pressure against the pump and hence slow the speed of the engine,
   whereby the increased back pressure causes the pivoted member to move the throttle arm in the direction which further opens the throttle, thereby tending to overcome the tendency for the eingine speed to decrease.

3. A combination according to claim 1 in which one of the pistons has a larger diameter than the other piston.

4. A combination according to claim 3 in which the piston rod connected to the larger diameter piston is pivoted to the pivoted member at a position of the member between the position where the member is pivoted to the connecting rod from the smaller diameter piston and a length of the member remote from the last-mentioned position.

5. A combination according to claim 4 in which the distance between the position of connection of the linkage means to the pivoted member and the position where the piston rod of the larger diameter piston is pivoted, is greater than the distance between the positions of pivoting of the two piston rods.

6. A combination according to claim 5 in which the first mentioned distance is about twice as great as the second mentioned distance.

7. A combination according to claim 4 in which the position of connection of the linkage means to the pivoted member is adjustable along the length of the member.

* * * * *